Patented Apr. 9, 1929.

1,708,914

UNITED STATES PATENT OFFICE.

BANESVAR DASS, OF BLOOMFIELD, NEW JERSEY, ASSIGNOR TO ELLIS-FOSTER COMPANY, A CORPORATION OF NEW JERSEY.

FOOD PRODUCT.

No Drawing.   Application filed October 4, 1921. Serial No. 505,280.

This invention relates to an edible food product comprising peanut butter and relates especially to peanut butter containing yeast material or vitamine concentrates. The present invention has for one of its objects the production of an edible product containing yeast, also to afford a palatable edible product containing vitamines A, B and C, or any one of them.

Ordinary wet yeast such as the yeast cakes of commerce contain in the neighborhood of 60 or 70% of moisture or perhaps even more. When such wet yeast is incorporated in any substantial amount with peanut butter fermentation sets in and the composition quickly acquires an unpleasant odor and flavor. In the present invention it is an object to produce a stable form of a mixture of peanut butter and yeast. This I find may be accomplished by reducing the proportion of water to a comparatively small amount.

For example I have found that in adding ordinary wet yeast, that is, the yeast cakes of commerce, to peanut butter in the proportion of 5 to 50% of the former fermentation sets in immediately with the higher percentages of yeast and with the lower percentages the product in a week or so may be highly impaired in flavor. By reducing the amount of moisture through drying the yeast, I have found that this fermentation does not take place but that a stable product is obtained which apparently keeps indefinitely. Using peanut butter of commerce containing little or no moisture or at the most probably not over 10 or 12% I preferably add dry yeast in the proportion of one pound of the yeast to four pounds of peanut butter. This dried yeast may be added during the process of manufacturing the peanut butter or it may be added after the butter has been finished and is ready for the market as such. In other words to ordinary peanut butter this proportion of dried yeast may be added either as a powder or preferably by grinding the dried yeast and peanut butter together. The dried yeast very often contains hard particles and for that reason it is advantageous to grind thoroughly in order that there may be no substances of a harsh or gritty feel in the product when it is consumed. The yeast may be ground with a portion of the peanut butter or if desired it may be ground in peanut oil or other suitable edible fat or suitable grinding medium and the concentrate incorporated with a larger bulk of peanut butter. The proportions stated of 1:4 are desirable ones but other proportions may be used without danger of fermentation. For example equal parts of yeast and peanut butter may be used if desired. The product may contain a major proportion of peanut butter or of yeast. The dried yeast, when incorporated with the peanut butter, even though the latter is present in minor amount does not give to the peanut butter a disagreeable taste or odor.

A product which I have prepared from about one part of dried yeast to four parts of peanut butter has been consumed by various persons, including children as well as adults, without being recognized that yeast was present. Children like the yeast-containing peanut butter spread on bread or biscuits equally well with peanut butter whereas most children are much averse to eating yeast in either the wet or dried form unaccompanied by other food products.

A criticism heretofore arising against peanut butter is the manner in which it sticks to the roof of the mouth. It possesses a curious kind of clayey quality which is somewhat objectionable. The addition of yeast in substantial amount, say 20% and upwards, tends to reduce this sticking quality and thus in fact renders the peanut butter composition more palatable than when yeast is not present.

Heretofore most yeast preparations which have been incorporated with other foodstuffs do not improve the quality of the foodstuffs but tend to impair it either in texture, flavor or some other manner but by my invention peanut butter is actually improved in quality and one feature of the present invention is the reduction in the sticking or clayey qualities of the peanut butter which in the appended claims I have termed anti-cloying action.

The dried yeast likewise may be incorporated with peanut butter containing other products such as olive butter or other foodstuffs or may be added to olive butter itself.

In a similar manner I have found that dried yeast may be incorporated with cheese to form a useful and tasty food product. For example when the dried yeast is added to pimento cheese or other strongly flavored cheese and well ground together so that there is no grittiness due to coarse hard particles an excellent product is obtained. On the other hand when wet yeast is mixed with cheese in a similar manner a quickly-fermenting product results. 20 to 25% of dried yeast may thus be incorporated with cheese to form a product in which no yeasty taste is noticeable.

The peanut butter employed is normally that of commerce and presumably or preferably contains a certain amount of salt so that it is probable that when the moisture content of the yeast is reduced below a certain point the salt or some other substance present in the peanut butter arrests or prevents the starting of fermentation. In order to aid such condition of stability additional salt or other preservative agent may be added, in case any be needed, and also it is possible to dry the mixture of peanut butter and yeast to a certain degree in case the moisture content is too high. Thus if peanut butter contains too much moisture when incorporated with dried yeast the mixture may be dried or the peanut butter may be separately dried. On the other hand a mixture of peanut butter with wet yeast may be dried to the non-fermenting stage. In the course of my experiments I recall one mixture of equal parts of peanut buttter and yeast which commenced within an hour or so to ferment vigorously. On the other hand, I have kept a mixture of dried yeast and peanut butter for many months without any susceptible deterioration in flavor or odor.

I do not limit myself to any specific form of yeast but preferably employ ordinary dry baker's yeast preferably containing a high content of water-soluble vitamine B. I may also add to the peanut butter composition suitable extracts of vitamine A and also vitamine C so that the peanut buttter may serve as a carrier for these vitamine bodies.

What I claim is:—

1. The process which comprises incorporating dried yeast and peanut butter in the absence of a sufficient quantity of moisture to permit fermentation.

2. Peanut butter incorporated with at least about 20% of yeast, the entire mixture containing insufficent moisture to permit fermentation, and such product being free from the excessive sticking qualities of ordinary peanut butter.

BANESVAR DASS.